United States Patent [19]

Kuehner et al.

[11] Patent Number: 5,188,806
[45] Date of Patent: Feb. 23, 1993

[54] METHOD AND APPARATUS FOR PRODUCING CARBON BLACK

[75] Inventors: Gerhard Kuehner, Hanau; Karl Vogel, Alzenau, both of Fed. Rep. of Germany; Juan D. Rodriguez, Dublin; Charles D. Clement, Pickerington, both of Ohio

[73] Assignee: Degussa AG, Postfach, Fed. Rep. of Germany

[21] Appl. No.: 721,765

[22] Filed: Jun. 28, 1991

Related U.S. Application Data

[63] Continuation-in-part of Ser. No. 635,890, Jan. 4, 1991, abandoned.

[51] Int. Cl.$^5$ .......................... C09C 1/00; C01B 31/00
[52] U.S. Cl. ..................................... 422/151; 422/150; 422/156; 422/207; 423/445; 208/48 Q
[58] Field of Search ............... 422/150, 151, 156, 157, 422/207; 423/445, 449, 450, 458; 208/48 Q

[56] References Cited

U.S. PATENT DOCUMENTS

| | | | |
|---|---|---|---|
| 2,682,450 | 11/1950 | Sweigart et al. | 422/151 |
| 2,705,190 | 7/1951 | Heller | 422/151 |
| 2,851,337 | 9/1958 | Heller | 423/455 |
| 3,410,660 | 11/1968 | Henderson et al. | 423/445 |
| 3,615,213 | 10/1971 | Shepherd | 423/450 |
| 3,642,446 | 2/1972 | Heller et al. | 423/455 |
| 3,725,103 | 4/1973 | Jordan | 106/472 |
| 4,058,590 | 11/1977 | Ruble | 423/449 |
| 4,106,912 | 8/1978 | Dollinger et al. | 422/151 |
| 4,165,364 | 8/1979 | Dollinger et al. | 423/456 |
| 4,213,939 | 7/1980 | Ruble | 422/151 |
| 4,250,145 | 2/1981 | Pobst, Jr. et al. | 422/151 |
| 4,320,090 | 3/1982 | Hunt | 422/150 |
| 4,391,789 | 7/1983 | Estopinal | 423/457 |
| 4,536,603 | 8/1985 | Sprouse et al. | 585/539 |
| 4,540,560 | 9/1985 | Henderson et al. | 423/445 |
| 4,588,557 | 5/1986 | Henderson | 422/108 |
| 4,664,901 | 5/1987 | Henderson | 423/450 |
| 4,765,964 | 8/1988 | Gravley et al. | 422/156 |
| 4,824,643 | 4/1989 | Gravley et al. | 422/151 |
| 4,826,669 | 5/1989 | Casperson | 423/456 |

FOREIGN PATENT DOCUMENTS

| | | |
|---|---|---|
| 0209908 | 1/1987 | European Pat. Off. |
| 0384080 | 8/1990 | European Pat. Off. |
| 0386655 | 9/1990 | European Pat. Off. |
| 1481152 | 7/1977 | United Kingdom |

*Primary Examiner*—Robert J. Warden
*Assistant Examiner*—Christopher Y. Kim
*Attorney, Agent, or Firm*—Beveridge, DeGrandi, Weilacher & Young

[57] ABSTRACT

A reactor and method for producing carbon black which involves arranging the combustion fuel conduits in a circumferential arrangement within the forward wall of the combustion chamber and providing an impact surface on the opposite side of the combustion chamber. The impact surface forms part of a forward wall of a constricting section which has a tapering passageway with a large opening in fluid communication with the combustion chamber and a smaller opening downstream. A throat passageway or restricting ring is provided at the downstream end of the tapering passageway and the throat passageway opens into an expansion chamber which, in turn, opens into a quenching chamber. Carbon black feedstock is injected into either the tapering passageway, the throat section, or both. The injection of the feedstock is achieved through the use of an axially extending lance and/or one or more radially extending injectors. Combustion oxidant is input through the same apertures formed in the forward wall of the combustion section. The resultant combustion products are impacted against the impact surface so as to create a highly turbulent flow of combustion gases which passes through the tapering passageway, throat passageway, expansion chamber, and quenching chamber.

38 Claims, 5 Drawing Sheets

METHOD AND APPARATUS FOR PRODUCING CARBON BLACK

This application is a continuation-in-part of U.S. application Ser. No. 07/635,890 filed Jan. 4, 1991 and incorporated herein by reference.

FIELD OF THE INVENTION

The present invention relates to a method and apparatus for manufacturing carbon black through thermal decomposition of a hydrocarbon following a rapid and uniform mixing of the hydrocarbon with a turbulent gas stream of combustion products.

BACKGROUND DISCUSSION

In general, the production of carbon black entails the cracking or thermal decomposition of a hydrocarbon feedstock in a reaction chamber at temperatures well above 2000° F. (e.g., 3000° F.). The carbon black entrained in the gases exiting the reaction chamber are then cooled in a quenching operation and then collected by any suitable means conventionally used in the art.

In the initial stages of reaction in the furnace, particles of carbon black are formed. These particles coalesce as the reaction continues and form much larger aggregates. During subsequent collection and densification stages in the carbon black manufacturing process, the aggregates pack together to form agglomerates. These agglomerates are often then further processed into pellets or beads in a separate pelletizing operation for ease in shipping of handling.

Carbon blacks have numerous uses with the major use being as a reinforcing agent or filler for the rubber and tire industries. Moreover, carbon black has seen increased use in other areas such as coloring agents and reprographic toners for copying machines. The various applications of carbon black necessitate a diverse range of carbon black characteristics such as particle size, structure, yield, surface area, and stain.

It is thus desirable to have a reactor which is adaptable for producing a wide assortment of different types of particle sizes and structure so as to handle various purchasing orders. That is, a reactor which is highly versatile avoids the disadvantage of having to rely upon a variety of different types of reactors to handle different orders. From a manufacturing standpoint, it is also desirable to have a reactor which is efficient in production (i.e., high yield) and capable of producing a high quality carbon black product while avoiding grit formation during the process.

Another consideration which is of importance in the production of carbon black is the avoidance of coke formation on the interior surface of the reactor as such coke formation tends to cause spalling of the inner refractory lining of the reactor. The coke and spalled refractory are contaminants and are highly undesirable in the product. In addition, the reactor should be userlikeable; in other words, easy to operate, easy to adjust for different uses and safe to operate. A carbon black reactor normally consists of different sections with special functions. These sections correspond with the different stages of the carbon black formation. The first section is the combustion section. It provides the energy necessary to crack the carbon black feedstock. A fuel, i.e. natural gas, is mixed with hot air for combustion and carbon black feedstock is then mixed with the hot combustion gases and carbon black is formed thereafter. The corresponding section is called the carbon black formation section, which is followed by the quench section. Depending on the desired carbon black grade a distinct residence time is necessary. The reaction is cut off by injecting water at different positions within the quench section.

A key feature to good reactor operation is a rapid and complete mixing of a high temperature combustion gas stream in with the carbon black feedstock. The temperature of the combustion gases being mixed with the feedstock should be maintained as uniform as possible such that the desired carbon black characteristics also remain highly uniform. The creation of a turbulent combustion gas flow in the area where the combustion gases intermix with the injected carbon black feedstock is one way to ensure a rapid and complete intermixing of the carbon black feedstock. However, in creating such turbulence care must be taken to ensure the combustion gases do not force the carbon black feedstock into contact with the interior walls of the reactor as such contact leads to coke formation. This coke formation problem was one of the disadvantages of the prior art reactors which utilized a vortex or tangential flow of the combustion gases as the swirling gases tended to impinge the newly introduced carbon black feedstock against the interior walls of the reactor.

Prior art reactors, such as that illustrated in U.S. Pat. No. 4,213,939, include axial flow reactors having the possibility of radial and axial introduction of carbon black feedstock. These reactors provide a certain degree of versatility in the types of carbon black capable of being produced, but suffer from the drawback of inadequate intermixing of the carbon black feedstock and axial flowing combustion gases due to a lack of turbulence in the flowing combustion gases.

Heller U.S. Pat. No. 2,851,337 discloses a process comprising the steps of generating hot combustion gases in a combustion chamber and passing the resultant gases through an elongated, unobstructed heat insulated chamber, gradually reducing the transverse area of the stream, injecting the hydrocarbon to be decomposed into the stream of hot gases passing through the constricted zone of the chamber and then gradually increasing the transverse area of the resultant stream as it continues through the chamber. The Heller patent, while perhaps providing a high velocity flow rate, fails to adequately create turbulence in the flow of combustion gas as the gas travels through the smooth, gradually curving design of the Heller reactor chamber.

SUMMARY OF THE INVENTION

The present invention introduces a reactor for producing carbon black and a method for producing carbon black which avoid the many problems associated with the prior art. More particularly, the present invention provides a reactor capable of producing high quality carbon black; that is, carbon black with desirable characteristics such as primary particle size, aggregate size, structure, specific surface area, yield, stain as well as low grit content. The carbon black produced by the present invention is proper in the sense that the carbon black produced does not vary to any great extent from predetermined carbon black characteristics.

The present invention also allows for a great range of products to be produced as the reactor is highly versatile and easily adaptable to produce a wide diversity of carbon black having the predetermined characteristics. Accordingly, the present invention enables an operator to handle a wide assortment of orders without relying upon different reactors.

Further advantages provided by the present invention include a high efficiency in converting carbon black feedstock into the desired carbon black as well as a large yield capability brought about by the rapid and uniform intermixing of the carbon black feedstock and combustion products at a relatively high temperature and speed.

Moreover, the advantageous characteristics of the present invention are not achieved at the expense of ease of operation and reactor maintenance. In other words, the present invention is easy to operate, provides a long reactor life time and is not subjected to a high degree of coke formation and the spalling which results from such coke formation.

In achieving the aforementioned advantages, the reactor of the present invention includes a combustion section having a forward wall with a plurality (e.g., 4 to 6 or even more) of circumferentially arranged apertures formed therein. The combustion section further includes a side wall extending rearwardly off of the forward wall so as to partially define a combustion chamber formed within the combustion section. A constricting section is provided downstream of the combustion section and includes a forward end wall which abuts the downstream end of the combustion section side wall. The combustion section and constricting section can be either separate units, attached together, or portions of a single continuous unit and, in either situation, are preferably formed of an internal refractory lining covered by a metallic covering.

The material forming the refractory, and outer lining can be those found conventionally in the art such as the castable refractory Kaocrete ® 32-cm which is 70% alumina (Al$_2$O$_3$) and has a melting point of 3400° F. Additionally, a brick refractory can be relied upon such as RUBY SR (sold by Harrison-Walker Refractories, Pittsburgh, Pa.) brick refractory which is 84.5% alumina along with 9.8% chromic oxide (Cr$_2$O$_3$) and has a melting point of 3720°.

The shell or lining is preferably formed of carbon steel except for any piping in contact with hot process air. In those areas, the piping is formed of "316 Stainless Steel".

The constricting section has a tapering passageway formed therein which has a forward opening at the forward end wall of the constricting section and a rearward opening downstream of the forward opening. The tapering passageway converges in an upstream to downstream direction and preferably is in the form of a frustoconical passageway. The forward opening of the tapering passageway is in fluid communication with the combustion chamber.

The constricting section also includes a throat passageway which is preferably cylindrical in shape with an upstream opening in communication with the downstream end of the tapering passageway. Further downstream from the throat passageway is positioned an expansion chamber which preferably is formed as part of the constricting section. Alternatively, the expansion chamber can be formed within a separate expansion section unit. The expansion chamber is preferably dimensioned as a cylinder and has a forward opening in communication with the throat passageway.

A quenching section is provided further downstream from the constricting section and expansion section. The quenching section includes al least one quenching chamber with an upstream opening in fluid communication with the expansion chamber. Extending into the quenching chamber in either a radial or axial direction is a single axial cooling fluid conduit or a plurality of radial cooling fluid conduits. The cooling fluid is sprayed within the quenching chamber to stop the carbon black reaction at the appropriate time and location.

The introduction of combustion oxidant (e.g., air or oxygen-enriched air or other oxygen containing gases) is achieved by an assembly which includes a combustion oxidant chamber positioned upstream from the forward wall of the combustion chamber. The combustion oxidant chamber preferably includes a radially extending combustion oxidant inlet. The combustion oxidant (e.g., preheated air) is fed into the combustion chamber through the circumferentially arranged apertures formed in the forward wall of the combustion section.

Combustion fuel conduits extend into the circumferentially arranged apertures so as to provide a means for introducing any suitable combustion fuel (e.g., natural gas, fuel oil or other gaseous or liquid hydrocarbons) into the combustion chamber. The ends of the circumferentially arranged combustion fuel conduits preferably extend through the combustion oxidant chamber through sealed openings in the combustion oxidant chamber.

Liquid carbon black feedstock (liquid hydrocarbons with high content of aromates such as creosote, catcracker oils, naphta cracker oils) is introduced through a plurality of radial passageways formed in the constricting section and/or a feedstock lance extending axially through a hole formed in the forward wall of the combustion section. In a preferred embodiment, a radial feedstock injector extends through each of the radial passageways formed in the constricting section so as to open into both the tapering passageway and the throat passageway. For producing the desired carbon black characteristics, the radially extending feedstock injectors can be provided with shut off valves such that feedstock is only introduced through certain of the feedstock injectors or the flow rate is varied for the feedstock flowing in the injectors.

The invention also provides a system which avoids any delay between the shutting off of the purge gas entering through the radial or axial feedstock injectors and the introduction of feedstock to the injector nozzles. In former systems, the purge gas was shut off at the time the feedstock oil was valved into the downstream oil line or hose which resulted in several seconds elapsing before the oil reached the nozzles. The present invention avoids this problem through use of an adjustable timing means (0–30 sec). By setting the timing means at an appropriate value, the introduction of purge gas is continued for the predetermined period required for the oil to reach the feedstock nozzle.

To even further enhance the flexibility of the present invention to achieve a diverse range of carbon black characteristics, an adjustable axially extending feedstock lance is positioned along a longitudinal center line of the reactor. Preferably the free end of the axially extending feedstock lance is within the tapering passageway. The axially extending feedstock lance can be used either without the radially extending feedstock lance or in combination therewith. Also, the axially extending feedstock lance can be provided with a single or dual nozzle outlet. According to the invention the maximum distance between the upstream and the downstream end of the combustion chamber is relatively short. For example, the preferred ratio of the combustion chamber's interior diameter over the longitudinal length of the combustion chamber's interior is 1.4 to 1.5. Another advantage of said short distance is the low heat loss caused by the usually water-cooled oil injector.

The present invention contemplates providing the outlets of both the axially extending feedstock lance and the radially extending feedstock injectors with nozzles capable of producing a variety of cone shaped sprays (e.g., 15, 30, 45 and 60 degree cone spray angles).

The radially extending feedstock injectors are also preferably arranged in spoke-like fashion at three different points along the longitudinal center line of the reactor. The first and second of the three positions would be at spaced intervals within the upstream portion of the constricting section such that the feedstock injector passageways open into the tapering passageway. The third position would have the feedstock injector passageways opening into the throat passageway. In a preferred embodiment of the invention for a middle sized reactor, each spoke arrangement of the feedstock injector passageways includes four to six passageways spaced at 90° or 60°, respectively, intervals. An increase in reactor size requires a higher number of passageways.

The number of combustion fuel conduits extending through the apertures formed in the forward wall of the combustion section preferably includes four to six of such conduits as well as an equal number of apertures. Six or more circumferentially arranged combustion fuel conduits arranged at equal spaced (e.g., 60°) intervals has proven satisfactory for the purposes of the present invention with the number of conduits increasing with increasing reactor size.

The combustion chamber of the present invention is formed of a first diameter which is greater than the diameter of the upstream opening formed in the tapering passageway. In this way, a ledge or impact wall is provided at the forward end of the constricting section. The apertures formed in the forward wall of the combustion section and the conduits extending therethrough are arranged about a circumference having a diameter which is less than that of the combustion chamber but greater than that of the upstream opening of the tapering passageway. Hence, the combustion products resulting from the reaction between the inflowing combustion oxidant and combustion fuel is impacted against the impact surface provided at the forward end of the constricting section. The impacted combustion product is thus placed in a highly turbulent state following impact and during the time it passes through the tapering passageway into contact with the feedstock being introduced.

Fuel and air flow rates are adjusted to give high temperatures and normally fall close to stoichiometric ratios. The limiting factor is refractory. Ratios must be adjusted to prevent melting the refractory. The desired ratio is to give as high a temperature as is safe. The range of air flows is quite broad, going, for instance, from a low of approximately 170,000 SCFH to a high of approximately 300,000 SCFH in the embodiment description in Table I discussed in further detail below. The invention, however, is not restricted to those dimensions; for larger reactors higher air flows are needed and for smaller reactors lower air flows are needed.

Moreover, the circumferential arrangement of the combustion fuel and oxidant allows for a uniform burning of the fuel and oxidant as it travels through the reactor flow passageway which is relatively large in view of the tapering passageway extending downstream from the combustion chamber.

The tapering passageway is preferably frustoconical in shape with side walls which convergingly slope at an angle between about 10 to 20° and, more preferably, about 15°. The upstream end of the throat passageway is preferably of a diameter which is equal to that of the downstream end of the tapering passageway. The expansion chamber has a diameter which is greater than that of the throat passageway but less than that of the forward opening of the tapering passageway. The diameter of the quenching chamber or chambers would be larger than that of the expansion chamber.

BRIEF DESCRIPTION OF THE DRAWINGS

The aforementioned advantages of the present invention will become apparent from the specification, drawings and claims. In the accompanying drawings, in which like numerals indicate like parts:

DETAILED DESCRIPTION OF THE PREFERRED EMBODIMENTS

Figure 1:
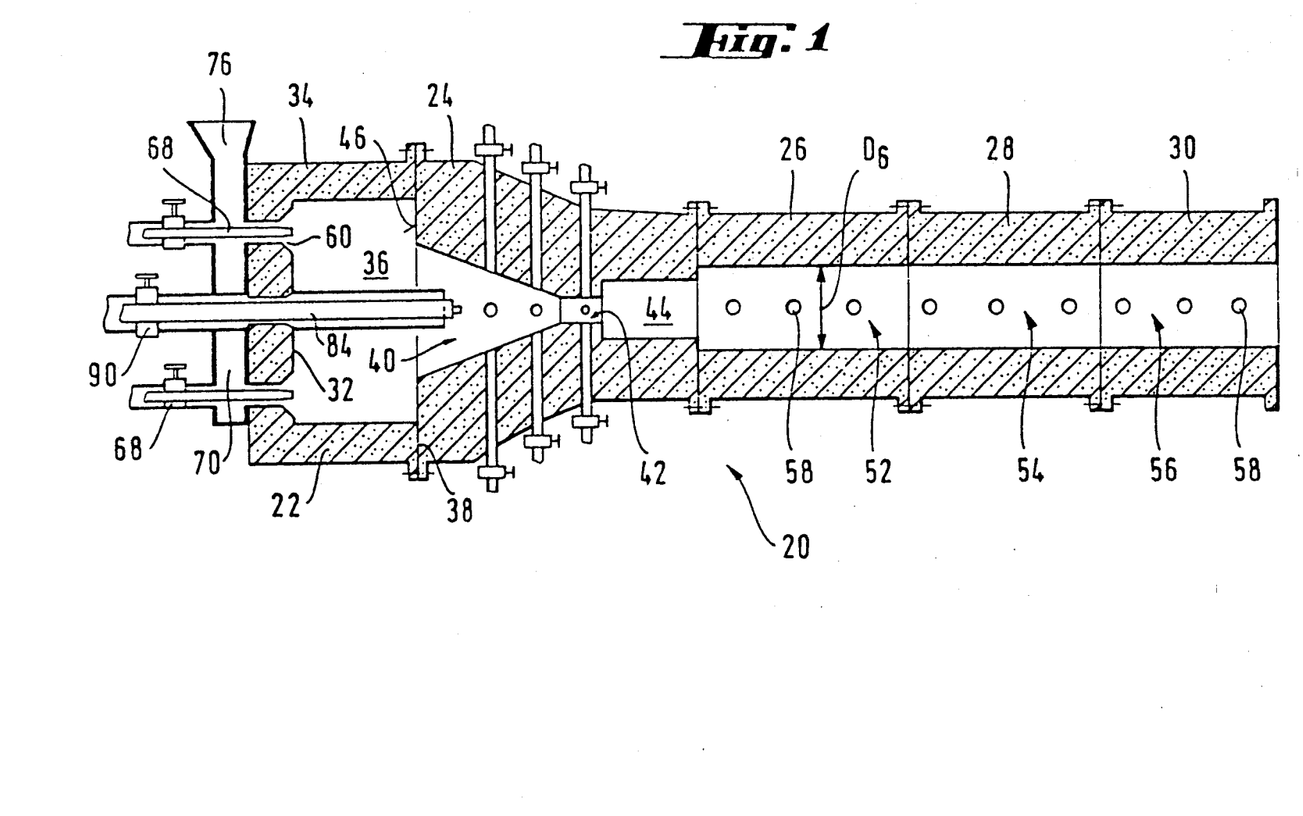
FIG. 1 is an elevational view of a cross-section of a preferred embodiment of the invention.
Figure 2:
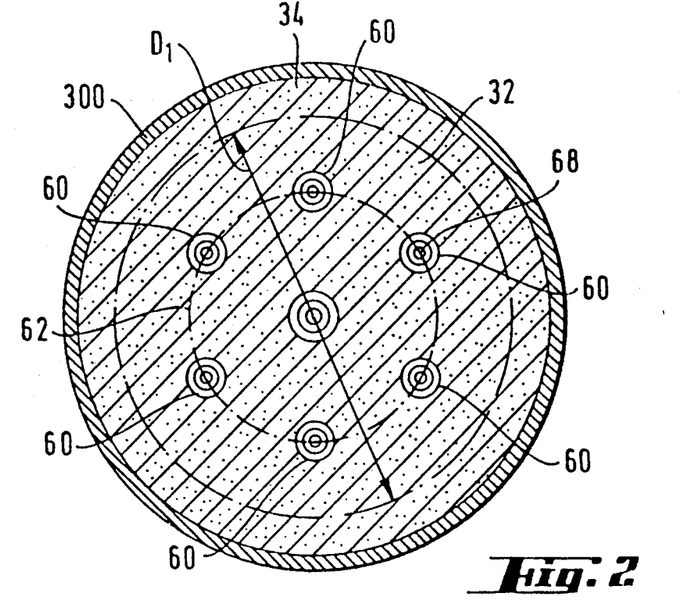
FIG. 2 illustrates a cross-sectional view of the reactor taken through the forward wall of the combustion section.

FIG. 1 illustrates a cross-sectional, elevational view of reactor 20 which comprises combustion section 22 positioned upstream from constricting section 24 which, in turn, is positioned upstream from quenching sections 26, 28 and 30. Combustion section 22 includes forward wall 32 and rearwardly extending side wall 34 which together partially define combustion chamber 36. Combustion chamber 36 is cylindrical in shape and of a first diameter D1 as shown in FIGS. 2 and 3.

Constricting section 24 includes forward end wall 38 which abuts the downstream end of side wall 34. As shown in FIG. 1, both the downstream end of side wall 34 and the upstream end of constricting section 24 include a flange. The flange of the constricting section and the combustion section can be joined together by way of nuts and bolts or any other suitable fastening device.

Figure 3:
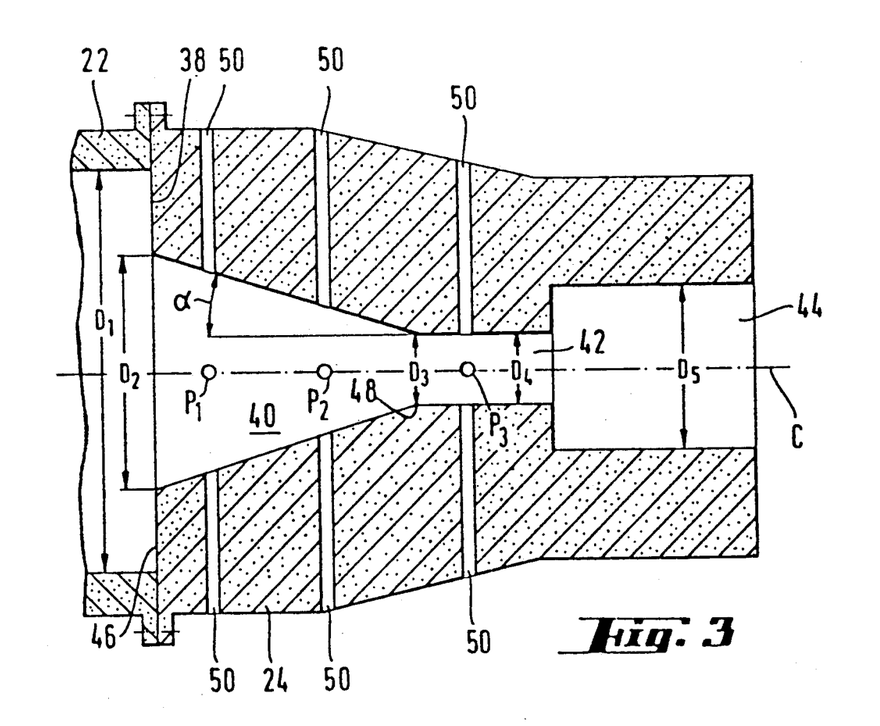
FIG. 3 illustrates a blown-up view of the constricting section of the present invention.

Constricting section 24 includes tapering passageway 40 as well as throat passageway 42 and expansion chamber 44 which are shown in greatest detail in FIG. 3. Tapering passageway 40 has a forward opening defined by the innermost edge of forward end wall 38. As shown in FIG. 3, the forward opening of tapering passageway 40 is of a diameter D2 which is less than diameter D1. The difference in the diameters D1 and D2 results in the formation of ledge or impact surface 46. Tapering passageway 40 is preferably frustoconical in shape with side walls which taper at an angle which is preferably about 10 to 20° and even more preferably about 15°. The ratio of D1:D2 is preferably in the range of 1.4:1 to 2.5:1 such that a sufficient impact surface is provided along with a large passageway for carbon black formation.

Throat passageway 42 is cylindrical in shape and has an upstream end commensurate with the downstream end 48 of tapering passageway 40. The downstream end 48 of tapering passageway 40 is of a diameter D3 which is preferably the same as the diameter D4 for the throat passageway. Expansion chamber 44 is also preferably cylindrical in shape with a diameter D5 which is greater than D4 but less than D2. In a preferred embodiment of the invention D1 would be about 40" to 50"; D2 would be about 20" to 28": D3 would be about 7" to 12": D4 would be about 7" to 12" and D5 would be about 12" to 18". The difference between D2 and D1 would also preferably lie between 12" to 30"with a preferred width of impact surface being 20.5".

FIG. 3 further reveals the formation of the radial feedstock injector passageways 50 which extend radially through the constricting section and open into the portions of the reactor flow passageway defined by tapering passageway 40 and throat passageway 42. In a preferred embodiment, three different sets of passageways 50 are formed in constricting section 24. Each of the three sets are spaced longitudinally along center line C of reactor 20 and each set includes a plurality of passageways (e.g., three or more) 50 arranged in spoke-like fashion. The three different sets of passageways are positioned at P1, P2 and P3 along center line C. Positions P1 and P2 results in passageways 50 opening into tapering passageway 40 while position P3 lies within throat passageway 42. Each set of passageways 50 is preferably formed of four of such passageways arranged at 90° intervals. Position P1 preferably is about 10" to 12" downstream along center line C from the forward opening of tapered passageway 40. Additionally, point P2 would be about 20" to 25" from the forward opening of tapering passageway 40 and P3 would be about 28" to 30" from the forward end of tapering passageway 40.

Referring again to FIG. 1, quenching chambers 52, 54 and 56, formed in quenching sections 26, 28 and 30, respectively, are cylindrical in shape and of a diameter D6 which is greater than diameter D5 but less than diameter D2. A plurality of radially extending inlets 58 are serially positioned in each of the quenching sections 26, 28 and 30 and provide a location in which a cooling fluid can be inserted. Such cooling fluid inlets can be arranged in spoke-like fashion as discussed for the radial feedstock injector passageways 50. As shown in FIG. 1, three quenching sections are provided. However, less or more of the similarly designed quenching sections can be provided as dictated by the final product characteristics desired.

Figure 4:
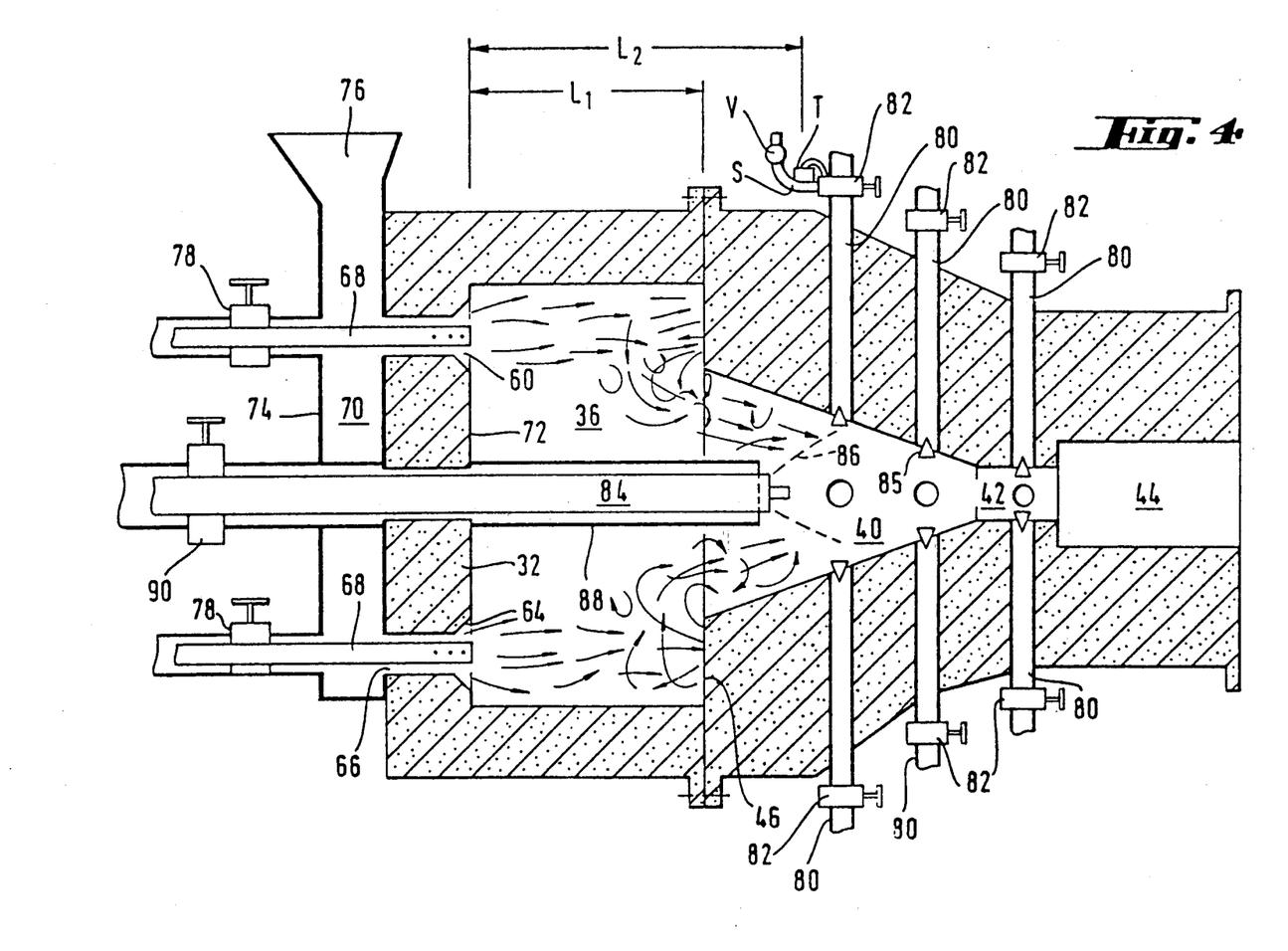
FIG. 4 illustrates a blown-up view of that which is shown in FIG. 1 with the exclusion of the quenching sections.

Referring now to FIGS. 1, 2 and 4, forward wall 32 of combustion section 22 includes apertures 60 having their mid-points arranged along circumference 62. As best shown in FIG. 4 apertures 60 include diverging outlets 64 and cylindrical inlets 66. The diameter of circumference 62 is less than that of diameter D1 but greater than that of diameter D2 such that the combustion products exiting aperture 60 impact against impact surface 46 prior to being drawn or forced into tapering passageway 40.

FIG. 2 illustrates one preferred arrangement of the apertures wherein 6 apertures are equally spaced at 60°intervals. Preferably anywhere between 4 to 6 equally spaced apertures are provided in the forward wall of the combustion section although the number would increase as the combustion chamber diameter D1 is increased for a larger sized reactor. Any less than 4 would tend to reduce the uniformity of the combustion products traveling through the combustion chamber while more than 6 for a reactor such as that having the dimensions described herein would create added piping complexity and present the possibility of wasted combustion products. The piping complexity problem would be especially acute with middle sized reactors if the same inflow of combustion reactants was attempted through a greater number (e.g., 8 or more) of apertures and fuel conduits of a smaller diameter.

FIG. 2 illustrates reactor 20 to be formed of a refractory interior. The refractory used is a high alumina (greater than 95%) material which exhibits a high melting point (e.g., greater than 3400° F.). FIG. 2 shows reactor 20 to include a metallic exterior covering or shell 300. The shell is composed of fabricated sheet metal and is normally carbon steel. In a preferred embodiment, a castable refractory material is used between the shell and a brick refractory inner surface.

As shown in FIGS. 1, 2 and 4, combustion fuel conduits 68 extend into aperture 60 through oxidant chamber 70. Combustion fuel conduits 68 are of a lesser diameter than the diameter of cylindrical inlet 66 such that the combustion oxidant in chamber 70 can be forced around combustion fuel conduits 68 and into combustion chamber 36. Combustion fuel conduits 68 are illustrated as extending into apertures 60 such that their outlet ends are flush with the internal surface 72 of forward wall 32. To enhance mixing of the combustion oxidant and combustion fuel, a plurality of small holes are formed at the free end of combustion fuel conduits 68 at a position near diverging outlet 64 of apertures 60. As noted, the combustion fuel conduits 68 have their free ends essentially flush with internal surface 72. However, the free ends could extend further into combustion chamber 36 or not as far within apertures 60 depending upon the desired characteristics of the reaction process.

The distance $L_1$ in FIG. 4 represents the longitudinal distance from the outlet of nozzle 68 to impact wall 46. In a preferred embodiment, $L_1$ is about 24" to 40" in length and more preferably about 31 inches. Also, combustion fuel conduits can be variable in position such that the distance $L_1$ can be varied to achieve even greater reactor versatility.

Oxidant chamber 70 is preferably formed of a cylindrical side wall with a circular front wall 74 spaced upstream from forward wall 32 of combustion section 22. Oxidant chamber 70 also preferably includes an inlet conduit 76 through which an oxidant (e.g., preheated air) is input. Combustion fuel conduits 68 are arranged to extend through oxidant chamber 70 prior to entering aperture 60. To maintain fuel conduits 68 at an appropriate temperature a fluid cooling conduit can be arranged in concentric fashion around the combustion fuel conduit. Additionally, valves 78 are provided to shut-off the oxidant fuel should the fuel conduits be withdrawn from the reactor. The combustion fuel can be any one of the combustion fuels typically used in the art such as natural gas.

Radial feedstock injectors 80 extend within passageways 50 formed in constricting section 24. Valve members 82 are provided on each of the feedstock injectors 80 so as to adjust or completely shut-off the flow of carbon black feedstock therein. Thus, carbon black feedstock can be input through any one or any combination of the radial feedstock injectors 80 or even none if sole reliance is placed on axially extending feedstock lance 84. Radial feedstock injectors are provided with nozzles 85 such that the introduced feedstock can be sprayed in a variety of cone shaped sprays (e.g., 0, 15, 30, 45 and 60°).

Axially extending feedstock lance 84 extends longitudinally along the center line C of reactor 20. Axial feedstock lance 84 also preferably includes a nozzle outlet 86 provided at the end of lance 84. The outlet nozzle 86 enables a varying degree of conical shaped feedstock sprays such as a 0°, 15°, 30°, 45° and 60° spray which further enhances the versatility of the reactor 20. Axial feedstock injector 84 is also preferably longitudinally adjustable along its central axis so as to extend to different lengths $L_2$ and to various positions within tapering passageway 40 or even within combustion chamber 36. In view of the high temperatures reached within the combustion and reaction areas of the reactor 20, a fluid cooling conduit 88 is arranged concentrically about axial feedstock lance 84. The length $L_2$ of the distance between the upstream end of the combustion chamber and the outlet of axial injector 84 varies with the different desired carbon black characteristics and the size of the reactor lying between the upstream end of the combustion chamber 36 and the downstream end of the conical reactor 40. However, a preferred range for $L_2$ while used with reactors sized such as that in Table I is 52" to 58".

$L_1$ also represents in FIG. 1 the distance between the upstream and the downstream end of the combustion chamber. As shown in FIG. 1, $L_1$ is relatively short and thus there is avoided high heat loss caused by water cooling conduit 88. For example, it is preferable that the diameter of the interior of the combustion chamber ($D_1$) be about 1.4 to 1.5 times larger than the longitudinal length of the combustion chamber interior.

Axial feedstock injector 84 is also provided with valve 90 to allow for removing feedstock injectors while preventing hot reactor internal gases from escaping the reactor. FIG. 4 also illustrates delay timer T and purge gas source and passageway S. Delay timer T triggers a solenoid valve V upstream of valve 82 so as to open a purge gas line into the header providing feedstock to the feedstock injectors.

Figure 5:
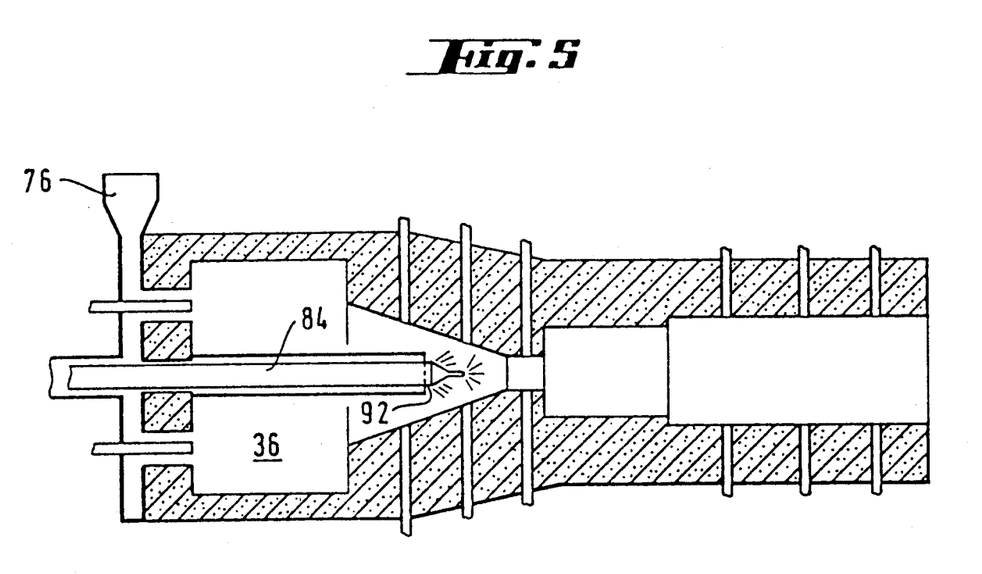
FIG. 5 illustrates an alternate embodiment of the present invention wherein an axially extending feedstock lance includes a dual nozzle output.

FIG. 5 illustrate the same arrangement as shown in FIG. 1 except for axial feedstock injector 84 having dual outlet nozzle 92 with each of the dual outlets capable of achieving a desired conical spray configuration. The arrangement of FIG. 5 thus provides yet another way of increasing the range of diverse products which the present invention can produce.

The feedstock introduced into the reactor can be any of those conventionally used in the art such as those disclosed in U.S. Pat. No. 3,642,446. An additive such as that described in U.S. Pat. No. 3,642,446 or an additive such as an oil soluble potassium ion additive such as that sold by Mooney Chemical, Inc., Cleveland, Ohio, or an equivalent thereof, can also be injected directly into the feedstock. In the preferred embodiment of the invention a potassium neocarboxyl mixture in a heavy aromatic hydrocarbon is used as the oil soluble additive which can go directly into the hot feedstock. One preferred potassium ion additive is characterized by the following properties:

| % metal | 7.00% |
| % water | 2.2% |
| Color | Brown |
| Viscosity | 980 centipoise |
| Spec. Gravity | 1.001 |
| LBS/GAL | 8.34 |
| Flash point °F. | >230 |

The preferred flow rate and velocity ranges for the combustion fuel, oxidant and feedstock (both axial and radial) is as follows when operated in the reactor embodiment of Table I:

TABLE I

| | Preferred Flow | Preferred Range of Flow |
|---|---|---|
| Air (oxidant) | 240,000 SCFH | 180,000–300,000 SCFH |
| Natural gas (combustion fuel) | 17,800 SCFH | 12,000–23,000 SCFH |
| (Feedstock) | 420 gph | 330–570 gph |

The velocity of the gases changes throughout the reactor with the diameter and also the temperature of the gases. The velocity of the gases across the throat should preferably be in the range of about 2000–3500 ft/sec.

In addition to describing feedstock flow in terms of velocity, feedstock is often set forth in terms of back pressure on the nozzles. The back pressure of the feedstock flow suitable for use in the present invention is in a range from about 100–250 psig.

The above-described flow rates is sufficiently high to give desired particle sizes as well as good production rates and yields. The above flow rates are also well matched with the previously described structure of the invention. The preferred temperature ranges for the oxidant, fuel and feedstock are as follows:

| | Temperature | Most Preferred |
|---|---|---|
| Oxidant | 800–1500° F. | 1400° F. |
| Fuel | 60–100° F. | 100° F. |
| Feedstock | 300–700° F. | 500° F. |

The temperature range for combustion products within the combustion section prior to introduction of feedstock is preferably about 2600°–3200° F. Within that range, the highest temperature (3200° F.) is most preferred. After the feedstock is injected, the temperature increases to 3300° briefly then decreases to less than 2800° prior to quenching.

In operation, combustion oxidant is input through oxidant inlet conduit 76 such that it passes through oxidant chamber 70 and then through apertures 60. At the same time, combustion fuel is input through combustion fuel conduits 68 such that a combustion reaction takes place at the outlet end of combustion fuel conduits 68. The axially directed combustion product of the combustion fuel and oxidant is directed across combustion chamber 36 such that a considerable portion of the combustion products impact against impact surface 46 due to the circumference of the circle scribed by the fuel injectors and oxidant nozzles being greater (e.g., 32" diameter) than the circumference of the wall at the start of the tapered section (e.g., 24-½").

As illustrated in FIG. 4, this impacting results in a great deal of combustion product turbulence. Moreover, the circumferential arrangement of the combustion fuel conduits tends to create a uniformly dispersed combustion product having a relatively uniform temperature throughout the combustion chamber. Accordingly, the highly turbulent and relatively uniformly temperatured combustion product is quickly drawn through tapering passageway 40 due to the pressure differential developed in the constricting section. The highly turbulent combustion product is rapidly mixed with the carbon black feedstock being injected either through the axially extending feedstock lance and/or the radially extending feedstock injectors. The desired characteristics of the resultant carbon black can be achieved by varying the pressure and flow rate of the oxidant gas as well as the pressure and flow rate of the combustion fuel. Furthermore, the rate of carbon black feedstock injection and the determination as to which of the feedstock feeding means is to be utilized also helps in varying the desired characteristics of the carbon black produced. Additionally, the position at which the quench water is injected also influences the quality of the product.

The high velocities of burned combustion gases bends the path of the feedstock being injected such that the feedstock does not impact on the interior surfaces of the reactor. Also, the exposure of the injected feedstock to the high sheer forces of the combustion gases and the high temperature (e.g., 3000° F.) serve to atomize the feedstock and quickly crack it into carbon black. The dense smoke created is later grounded by injecting cooling fluid into the quenching sections.

In utilizing the present invention, the following ranges and values of the carbon black characteristics are possible:

| Primary particle size | up to 40 nanometers |
|---|---|
| Tint | 90–130 |
| DBP | 40–180 |

The impacting of the combustion gases causes a better mixing and intermingling and thus a highly turbulent flow. The highly turbulent flow avoids the development of laminar flow in the reactor which could create hot and cold zones that can cause poor cracking and result in a nonuniform product and hazard the refractory lining of the reactor.

The diameter of the circumference on which the apertures in the forward wall lie are required to be larger than the internal diameter of the start of the tapered section. A difference in diameter of about 3½ inches to 11½ inches would be suitable for the purposes of the present invention. For example, with the internal diameter of the start of the tapered section being 24.5 inches, a suitable range for the diameter of the circumference about which the forward wall apertures extend would be 28 inches to 36 inches.

The tables below provide an illustration of the preferred reactor dimensions and of the quality of the product produced and the diversity of the present invention in producing carbon black. Table I below provides a list of the most preferred dimensions for reactor 20.

TABLE I

| | | |
|---|---|---|
| 1. | Diameter of Combustion Chamber ($D_1$) | 45 inches |
| 2. | Combustion Chamber Length (axial distance between surface 72 and surface 46) | 31 inches |
| 3. | Diameter of upstream opening in tapering passageway 40 ($D_2$) | 24.5 inches |
| 4. | Diameter of downstream opening in tapering passageway 40 ($D_3$) | 8 inches |
| 5. | Axial length of tapering passageway | 30 inches |
| 6. | Diameter of throat passageway ($D_4$) | 8 inches |
| 7. | Axial length of throat passageway | 9 inches |
| 8. | Diameter of expansion chamber ($D_5$) | 15 inches |
| 9. | Axial length of expansion chamber | 42.25 inches |
| 10. | Diameter of quench chambers ($D_6$) | 24 inches |
| 11. | Axial length of each quench chamber | 63 inches |
| 12. | Axial length from forward end of constricting section to first position ($P_1$) | 12 inches |
| 13. | Axial length from forward end of constricting section to second position ($P_2$) | 24 inches |
| 14. | Axial length from forward end of constricting section to third position ($P_3$) | 34.5 inches |
| 15. | Diameter of circumference upon which the centerpoints of apertures 60 lie | 32 inches |

Figure 6:
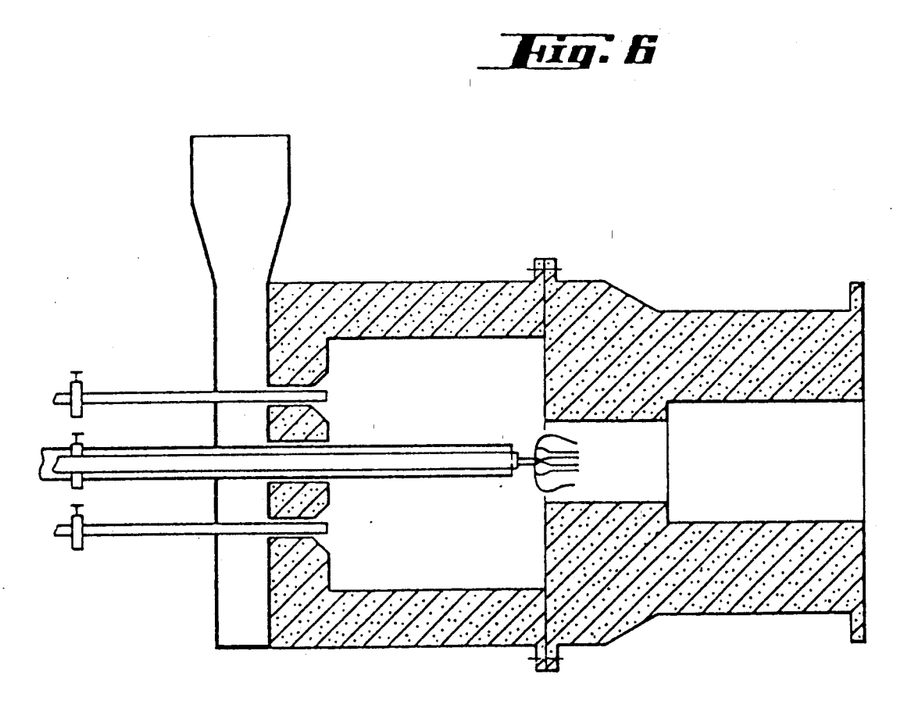
FIG. 6 illustrates a "standard reactor" in cross-section.

Table II below provides the results of a comparison test between the present invention (Reactor #1) and two comparison reactors (#2 and #3). The comparison reactors were similar in design with the design illustrated in FIG. 6. The reactor shown in FIG. 6 represents the standard reactor used previously inhouse by DeGussa Corporation to produce carbon black for sale. The standard reactor is shown to include a plurality of combustion gas nozzles which are positioned in circumferential fashion in a forward wall of the reactor. Feedstock injection is shown to be along the central axis of the standard reactor and the throat section of the standard reactor is shown to be immediately adjacent to the cylindrical combustion chamber.

The data in Table II was obtained through use of a reactor similar to that illustrated in FIG. 1 and having the dimensions noted in Table I. The data were obtained for feedstock introduced radially through four equally spaced injectors at the point $P_3$ with a nozzle spray of 30°.

TABLE II

| Time Period | Reactor Number | Oil Rate | Iodine | DBP | Tint | Air Flow | Air Temp | Quench Volume | BTU/lb. |
|---|---|---|---|---|---|---|---|---|---|
| $T_1$ | 1 | 408 | 136.9 | 136.3 | 115.0 | 240,000 | 990 | 29.1 | — |
| | 2 | 397 | — | — | — | 240,000 | 1160 | 28.0 | — |
| $T_2$ | 1 | 466 | 95.8 | — | 111.9 | 240,000 | 990 | 29.1 | — |
| | 2 | 348 | 88.3 | — | 115.4 | 240,000 | 1130 | 5.6 | — |
| $T_3$ | 1 | 401 | 102.1 | 144.8 | — | 240,000 | 950 | 12.6 | 38,049 |
| | 3 | 348 | 103.9 | 151.8 | — | 240,000 | 1120 | 5.6 | 37,353 |
| $T_4$ | 1 | 410 | 94.2 | 134.2 | — | 240,000 | 950 | 12.6 | 27,119 |
| | 3 | 395 | 89.2 | 139.1 | — | 240,000 | 1135 | 5.6 | 36,608 |
| $T_5$ | 1 | 400 | 134.5 | 130.2 | — | 240,000 | 990 | 29.1 | 39,978 |
| | 2 | 363 | 136.1 | 129.8 | — | 240,000 | 1160 | 28.0 | 41,683 |
| $T_6$ | 1 | 365 | 90.9 | 110.6 | — | 210,000 | 990 | 12.6 | 37,161 |
| | 2 | 322 | 104.0 | 138.4 | — | 210,000 | 1135 | 5.6 | 39,085 |
| $T_7$ | 1 | 392 | 90.9 | 110.6 | — | 210,000 | 990 | 12.6 | 36,755 |

TABLE II-continued

| Time Period | Reactor Number | Oil Rate | Iodine | DBP | Tint | Air Flow | Air Temp | Quench Volume | BTU/lb. |
|---|---|---|---|---|---|---|---|---|---|
| | 2 | 378 | 98.1 | 138.4 | — | 210,000 | 1135 | 9.8 | 38,776 |

Oil Rate: Gallons per hour of liquid feedstock (heavy oil with an average specific gravity of 1.114 ± .0070 and the above discussed potassium additive) inputted through 4 radial injectors at the $P_3$ location
Iodine: The iodine number is determined in accordance with ASTM Designation: D1510-84. $I_2\#$ (used below) is an abbreviation for "Iodine Number"
DBP: Standard test wherein 'structure' of carbon black is determined by dibutyl phthalate absorption. The DBP test is described in ASTM Designation: D3493-85a. The term "24m4" used below is described in that test designation
Tint: Standard test involving the light absorption of a carbon black/zinc-oxide paste
Air Flow: Air flow values are given in SCFH (STANDARD CUBIC FEET PER HOUR)
Air Temp: The temperature of the air being introduced into combustion chamber in °F.
Quench Vol: Quench volume is volume of reactor after the choke or restriction ring and up to the quench point. The units are cubic feet. Quench water inlet is a port through the refractory through which the quench pipe or lance is inserted. The quench ports are aligned along the centerline of the reactor. "C" sections or quench sections. There are approximately 10 locations along the length per reactor.
BTU/lbs: A The British Thermal units (1 kw = 3412 BTU/hr) utilized per pound of product produced
*All unfilled values in Table II are the result of non-testing In reviewing Table II, it should be noted that reactor #1 had an air preheat which was lower, by 150–200° F., than that used for reactors #2 and #3 due to differences in equipment. Historical data suggests that for every 100° of air preheat increase, the oil rate generally increases 5% and the yield generally increase 1%.

The comparison data in Table II (Time Period $T_5$) illustrates that the oil rate for reactor #1 is 10.2% higher than the comparison reactor #2 and the energy utilization is 1705 BTU/lb lower. This advantage over the comparison reactors is achieved in spite of the 170° F. lower air preheat temperature.

If corrections for the difference in air preheat are made then the difference between the two reactors is even greater as shown below:

| | Feedstock Rate at 990° F. Air | Feedstock Rate at 1160° F. Air | BTU/# at 1160° F. Air |
|---|---|---|---|
| Reactor #1 | 400 gph | 434 gph* | 39095 |
| Reactor #2 | — | 363 gph | 41683 |
| change = | | +71 gph | −2588 BTU/# |

*(Calculated value)

the total improvement is 19.5% in oil rate and 6.2% in energy utilization per pound of black.

Table II illustrates how the present invention is particularly well adapted for increasing the production rate and energy efficiency while maintaining a high quality product and without the prior art problems of destructive spalling.

The present invention is also well suited for varying the resultant product to meet specific needs. For example, movement of the location of the injectors upstream to $P_2$ and an increase in the spray angle (60°) has shown the following results, while keeping feedstock rate constant.

| Position | I2 # | DBP | 24m4 | Tint |
|---|---|---|---|---|
| Center Location ($P_2$) | 97.5 | 163.5 | 105.1 | 106.7 |
| Downstream Location ($P_3$) | 101.3 | 155.8 | 97.5 | 110.0 |
| Conditions: | | | | |
| Air Rate | 215M SCFH | | | |
| Air/Gas | 13:1 | | | |
| Air Temp. | 1200° F. | | | |
| Feedstock Rate | 440 GPH | | | |
| Feedstock Add. | 0 | | | |

Thus, by moving the injection point upstream to $P_2$ a higher DBP and 24m4 value was obtained while the tint and iodine number values dropped. These variances reflect the versatility of the present invention in meeting the different needs of individual customers.

Although the present invention has been described with reference to a preferred embodiment the invention is not limited to the details thereof. Various substitutions and modifications will occur to those of ordinary skill in the art, and all such substitutions and modifications are intended to fall within the spirit and scope of the invention as defined in the appended claims.

We claim:

1. A carbon black reactor, comprising:
   a casing having formed therein a reaction flow passage which extends in an upstream to downstream direction, said casing including a central longitudinal axis and said reaction flow passage extending along said central longitudinal axis, said reaction flow passage including, in an upstream to downstream direction, a combustion chamber, a tapering passageway, and a quenching chamber, said casing including a forward wall defining an upstream end of said combustion chamber and a ledge extending inwardly towards said central longitudinal axis in a direction essentially transverse to said central longitudinal axis, said ledge defining a downstream end of said combustion chamber and an upstream opening in said tapering passageway, the tapering passageway constricting in an upstream to downstream direction, and said forward wall having means defining a plurality of apertures which open into said combustion chamber and are arranged circumferentially at a first radius from the central longitudinal axis, and the opening in the upstream end of said tapering passageway being of a second radius from the central axis with the second radius being smaller than said first radius.

2. A carbon black reactor as recited in claim 1, wherein said reaction flow passage formed in said casing includes a throat passageway having a diameter essentially equal to the minimum diameter of said tapering passageway and said throat passageway is positioned between said tapering passageway and said quenching chamber.

3. A carbon black reactor as recited in claim 2, wherein said reaction flow passage formed in said casing includes an expansion chamber having a diameter greater than said diameter of said throat passageway, and said expansion chamber positioned between said throat passageway and said quenching zone.

4. A reactor for carbon black production, comprising:

a combustion section having a forward wall with means defining a plurality of circumferentially arranged apertures, said combustion section further including a side wall extending rearwardly off of said forward wall to partially define a combustion chamber formed in said combustion section, and said combustion chamber being of a first diameter;

a constricting section having a forward end wall abutting the side wall of said combustion section, said constricting section having a tapering passageway formed therein which has means defining a forward opening of a second diameter and means defining a rearward opening of a third diameter, said constricting section further including a throat passageway of a fourth diameter, and said throat passageway having means defining a forward opening in fluid communication with the rearward opening of said tapering passageway, said constricting section including an expansion section positioned rearward of said throat passageway and having an expansion chamber formed therein which opens into the rearward end of said throat passageway which is of a fifth diameter;

a quenching section which includes at least one quenching chamber of a sixth diameter and which is in fluid communication with said expansion chamber;

a combustion oxidant conduit in fluid communication with the circumferentially arranged apertures formed in the forward wall of said combustion chamber;

a plurality of combustion fuel conduits extending into said circumferentially arranged apertures;

a radial feedstock injector extending through a radial passageway formed in said constricting section; and said first diameter being greater than said second diameter, and said circumferentially arranged apertures lying on a circumference having a diameter which falls between said first and second diameters.

5. A reactor as recited in claim 4, further comprising an axial feedstock lance extending through a hole formed in said forward wall.

6. A reactor as recited in claim 5, wherein said axial feedstock lance extends through the center point of the circumference upon which said circumferentially arranged apertures lie and along a central longitudinal axis of said reactor.

7. A reactor as recited in claim 6, wherein said constricting section includes a plurality of said radial passageways, and said reactor further comprises a plurality of radial feedstock injectors extending through said radial passageways such that at least one of said radial feedstock injectors opens into said tapering passageway and at least one of said radial feedstock injectors opens into said throat passageway.

8. A reactor as recited in claim 7, wherein said plurality of feedstock injectors are arranged in a spoked arrangement at first, second and third positions along the central longitudinal axis of said reactor, with said feedstock injectors in said first and second positions opening into said tapering passageway and the feedstock injectors in said third position opening into said throat section.

9. A reactor as recited in claim 8, wherein there are four radial feedstock injectors arranged in a spoked arrangement at said first, second and third positions with each of said four radial feedstock injectors spaced 90° apart.

10. A reactor as recited in claim 5, wherein there are six of said circumferentially arranged apertures at 60° intervals from one another.

11. A reactor as recited in claim 5, wherein said axial feedstock injector includes axially spaced nozzle outlets.

12. A reactor as recited in claim 5, further comprising adjustment means for adjusting said axial feedstock injector to different positions along said central longitudinal axis.

13. A reactor as recited in claim 4, wherein there are between 4 to 6 of said circumferentially arranged apertures with each aperture having a central point lying on a common circumference, and said apertures being spaced at essentially equal intervals along said circumference.

14. A reactor as recited in claim 4, wherein there are six of said circumferentially arranged apertures at 60° intervals from one another.

15. A reactor as recited in claim 4, wherein said tapering passageway is frustoconical in shape and convergingly slopes at an angle of between about 10 to 20°.

16. A reactor as recited in claim 15, wherein said tapering passageway convergingly slopes at an angle of about 15°.

17. A reactor as recited in claim 4, wherein said third and fourth diameters are equal.

18. A reactor as recited in claim 17, wherein said fifth diameter is larger than said fourth diameter and smaller than said second diameter.

19. A reactor as recited in claim 4, wherein said combustion oxidant conduit includes an inlet extending out away from said reactor and a chamber secured to a forward surface of said forward wall such that oxidant is forced through said circumferentially arranged apertures formed in said forward wall and over said combustion fuel conduits extending into said apertures.

20. A reactor as recited in claim 4, wherein said first diameter is from about 40 to 50 inches, said second diameter is about from 20 to 28 inches, and the circumference along which said apertures lie is from about 28 to 38 inches.

21. A reactor as recited in claim 20, wherein the longitudinal length of said combustion chamber is about 24 inches to 40 inches and the longitudinal length of said tapering passageway is about 26 to 36 inches.

22. A reactor as recited in claim 21, wherein said throat passageway has a diameter of about 7 to 12 inches and a longitudinal length of about 7 to 12 inches.

23. A reactor as recited in claim 4, wherein said first diameter is about 45 inches, said second diameter is about 24.5 inches, said combustion chamber has a longitudinal length of about 31 inches, and said tapering passageway has a longitudinal length of about 30 inches.

24. A reactor as recited in claim 23, wherein said fourth diameter is about 8 inches and said throat passageway has a longitudinal length of about 9 inches.

25. A reactor for producing carbon black which has a central longitudinal axis, comprising:

a combustion section having a cylindrical side wall extending off of a forward wall so as to partially define a combustion chamber, said combustion chamber having a first diameter, and said forward wall having means defining a plurality of apertures circumferentially arranged in said forward wall;

a constricting section including a tapering passageway in fluid communication with said combustion chamber, said tapering passageway being frustoconical in shape and having means defining a larger forward opening of a second diameter and means defining a smaller rearward opening of a third diameter, said constricting section further including a throat passageway of a fourth diameter in fluid communication with said tapering passageway, said first diameter being larger than said second diameter such than an impact surface is provided where said combustion chamber opens into said tapering passageway;

a combustion oxidant conduit in fluid communication with the apertures formed in said forward wall such that input oxidant flows through said apertures and into said combustion chamber;

a plurality of combustion fuel conduits extending within said apertures in an arrangement wherein the combustion oxidant is free to pass around said fuel conduits, and the circumferentially arranged apertures formed in said forward wall lying on a circumference having a diameter which is greater than said second diameter and smaller than said first diameter such that combustion products produced in said combustion chamber are impacted against said impact surface prior to passing within said tapering passageway;

feedstock feeding means for feeding carbon black feedstock into said reactor; and a quenching section having a quenching chamber in fluid communication with said throat passageway.

26. A reactor as recited in claim 25, wherein said constriction section includes an expansion zone with an expansion chamber positioned between said throat passageway and said quenching chamber.

27. A reactor as recited in claim 25, wherein there are four or more of said combustion fuel conduits.

28. A reactor as recited in claim 25, wherein said feedstock feeding means includes a plurality of radial feedstock conduits extending through said constricting section and opening into said tapering passageway.

29. A reactor as recited in claim 28, wherein said feedstock feeding means further includes a plurality of radial feedstock conduits extending through said constricting section and opening into said throat passageway.

30. A reactor as recited in claim 29, wherein said feedstock feeding means includes an axial feedstock lance extending through said forward wall and along the longitudinal central axis of said reactor.

31. A reactor as recited in claim 25, wherein said feedstock feeding means includes an axial feedstock lance extending through said forward wall and along the longitudinal central axis of said reactor.

32. An apparatus as recited in claim 1 wherein said combustion chamber has an interior diameter which is 1.4 to 1.5 times longer than the interior longitudinal length of said combustion chamber.

33. A method for producing carbon black in a reactor having a central longitudinal axis, comprising:

introducing combustion fuel and oxidant through a plurality of apertures circumferentially arranged about said longitudinal central axis in a forward wall of a combustion section of said reactor;

impacting a combustion product of said combustion fuel and oxidant against an impact surface extending essentially transverse to the central longitudinal axis of said reactor to an inner edge defining an opening in a tapering passageway, said impacting being due to said plurality of apertures being positioned further from the central longitudinal axis than the inner edge of said impact surface;

passing said impacted combustion product through the tapering passageway which opens into said combustion chamber and through a throat passageway which opens into said tapering passageway;

introducing carbon black feedstock into contact with said combustion product following entry of said combustion product into said tapering passageway; and quenching a reactant of said combustion product and carbon black feedstock subsequent to passage of said reactant through said tapering passageway.

34. A method as recited in claim 33, wherein the step of introducing carbon black feedstock includes injecting feedstock radially into said tapering passageway.

35. A method as recited in claim 33, wherein the step of introducing carbon black feedstock includes injecting feedstock radially into said throat passageway.

36. A method as recited in claim 34, wherein the step of introducing carbon black feedstock includes injecting feedstock from a feedstock lance extending axially along the central longitudinal axis of said reactor.

37. A method as recited in claim 35, wherein the step of introducing carbon black feedstock includes injecting feedstock axially along the central longitudinal axis of said reactor.

38. A method as recited in claim 33, wherein the step of introducing carbon black feedstock includes injecting feedstock axially along the central longitudinal axis of said reactor.

* * * * *